US009616676B2

(12) United States Patent
Van Hameren et al.

(10) Patent No.: US 9,616,676 B2
(45) Date of Patent: Apr. 11, 2017

(54) INK COMPOSITION

(71) Applicant: OCE-TECHNOLOGIES B.V., Venlo (NL)

(72) Inventors: Richard Van Hameren, Herten (NL);
Ronald Groothuijse, Sevenum (NL);
Peter R. Markies, Grubbenvorst (NL);
Mark A. M. Leenen, Venlo (NL);
Mark Hoeijmakers, Breda (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 14/833,837

(22) Filed: Aug. 24, 2015

(65) Prior Publication Data
US 2016/0002480 A1    Jan. 7, 2016

Related U.S. Application Data

(63) Continuation of application No. PCT/EP2014/054342, filed on Mar. 6, 2014.

(30) Foreign Application Priority Data

Mar. 7, 2013   (EP) .................................... 13158157
Mar. 7, 2013   (EP) .................................... 13158163

(51) Int. Cl.
B41J 2/21       (2006.01)
C09D 11/14      (2006.01)
(Continued)

(52) U.S. Cl.
CPC ........... B41J 2/2107 (2013.01); C09D 11/104 (2013.01); C09D 11/106 (2013.01); C09D 11/14 (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 4,418,174 A    11/1983  Dhein et al.
5,922,117 A *   7/1999  Malhotra ............... C09D 11/36
                                                   106/31.13
(Continued)

FOREIGN PATENT DOCUMENTS

CN          101180373 A      5/2008
EP            0812888 A2    12/1997
WO    WO 2012/123267 A1     9/2012

OTHER PUBLICATIONS

International Preliminary Report on Patentability (Forms PCT/IPEA/416 and PCT/IPEA/409) for International Application No. PCT/EP2014/054342, dated May 29, 2015.
(Continued)

Primary Examiner — Manish S Shah
(74) Attorney, Agent, or Firm — Birch, Stewart, Kolasch & Birch, LLP

(57) ABSTRACT

The invention relates to an ink composition including a water-dispersed resin a water dispersible colorant and water and wherein the ink composition further includes a co-solvent, wherein the co-solvent is selected from the group consisting of saccharides and co-solvents having a ring structure, wherein the ring structure contains a 5-membered, a 6-membered or a 7-membered ring. Additionally, the ink composition includes a cyclodextrin compound. The invention further relates to a method for preparing such ink compositions and to a method for applying an image onto a receiving medium using such ink composition.

10 Claims, 2 Drawing Sheets

(51) Int. Cl.
    *C09D 11/322*     (2014.01)
    *C09D 11/38*     (2014.01)
    *C09D 11/104*     (2014.01)
    *C09D 11/106*     (2014.01)
    *C09D 11/36*     (2014.01)

(52) U.S. Cl.
    CPC ............ *C09D 11/322* (2013.01); *C09D 11/36* (2013.01); *C09D 11/38* (2013.01)

(58) Field of Classification Search
    CPC .... B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
    USPC .................................................. 347/95–105
    See application file for complete search history.

(56) References Cited

U.S. PATENT DOCUMENTS

| | | | |
|---|---|---|---|
| 5,954,866 A * | 9/1999 | Ohta | C09D 11/322 106/31.68 |
| 2007/0248838 A1 | 10/2007 | De Saint-Romain | |
| 2008/0191171 A1 | 8/2008 | Mentink et al. | |
| 2012/0073468 A1* | 3/2012 | Koganehira | C09D 11/322 106/31.13 |
| 2012/0200633 A1* | 8/2012 | Aoyama | B41J 2/155 347/100 |
| 2012/0227619 A1 | 9/2012 | Koganehira et al. | |
| 2012/0227620 A1 | 9/2012 | Koganehira et al. | |

OTHER PUBLICATIONS

International Search Report, issued in PCT/EP2014/054342, mailed May 16, 2014.
Written Opinion of the International Searching Authority, issued in PCT/EP2014/054342, mailed May 16, 2014.

* cited by examiner

INK COMPOSITION

CROSS REFERENCE TO RELATED APPLICATIONS

This application is a Continuation of PCT International Application No. PCT/EP2014/054342 filed on Mar. 6, 2014, which claims priority under 35 U.S.C. §119(a) to Patent Application Nos. 13158163.9 and 13158157.1 filed in Europe on Mar. 7, 2013, all of which are hereby expressly incorporated by reference into the present application.

The present invention relates to an ink composition. The present invention further relates to a method for preparing said ink composition. The present invention also relates to a method for applying an image onto a receiving medium.

BACKGROUND OF THE INVENTION

Inks comprising a water-dispersed resin, a water-dispersible colorant and water are known in the art. Such ink compositions are also known as latex inks. Latex inks may be used for printing images onto a receiving medium, for example using ink jet printing. Latex inks are known to give robust images, due to a layer of polymer particles that is formed on the surface of the receiving medium protecting the colorant particles.

A known problem of latex inks is that the properties of the ink within the print head may deteriorate upon evaporation of water. Because evaporation of water, the ink composition may thicken, leading e.g. to a viscosity increase or precipitation of solid particles from the ink composition may occur, decreasing the jetting stability.

It is known to add co-solvents to a latex ink, which results in a latex ink having a liquid vehicle comprising water and one or more co-solvents. The addition of such co-solvent may result in slowing down the evaporation of the liquid vehicle. The co-solvent may also assist in stabilization of the pigment particles and/or the water dispersed resin particles in the ink composition, preventing the formation of solid precipitates.

When the ink has been applied onto the recording medium, e.g. by jetting droplets of the ink composition onto the recording medium, then the ink has to dry. As a consequence, the liquid vehicle, comprising water and the at least one co-solvent, need to be removed. This may be done by absorption in the recording medium and/or evaporation of the liquid vehicle. However, absorption of the liquid vehicle by the recording medium may only be possible when the recording medium is a porous medium. If the recording medium is a non-porous medium, no liquid may be absorbed by the medium. In the latter case, all solvents present may need to be removed by evaporation.

This is a disadvantage from several points of view. For example, evaporation of liquids consumes energy. In addition, by evaporating a co-solvent, vapors of this co-solvent are formed. Vapors of co-solvents may be harmful from a health, safety & environmental (HSE) point of view. For example, these vapors may be toxic and/or flammable.

It is therefore an object to provide an ink composition that requires less energy when drying. It is a further object of the invention to provide an ink composition that forms no or only little harmful vapors. It is a further object of the invention to provide an ink composition which is stable in the print head. It is a further object of the invention to provide an ink composition which allows fast drying of the ink after printing. It is a further object of the invention to provide an ink composition which provides robust images.

SUMMARY OF THE INVENTION

The objects of the invention are at least mitigated in an ink composition comprising a water-dispersed resin; a water dispersible colorant; a cyclodextrin compound; water and a co-solvent, wherein the water-dispersed resin is present in an amount of 3.5 wt % or more, based on the total weight of the ink composition, and wherein the co-solvent is selected from the group consisting of: saccharides and co-solvents comprising a ring structure, wherein the ring structure comprises a 5-membered, a 6-membered or a 7-membered ring.

Water-Dispersed Resin (Latex Resin)

The inkjet ink according to the present invention contains a water-dispersed resin in view of the fixability of the colorant to recording media. As the water-dispersed-resin, a water-dispersed resin capable of film formation (image formation) and having high water repellency, high waterfastness, and high weatherability is useful in recording images having high waterfastness and high image density (high color developing ability).

Examples of the water-dispersed resin include synthetic resins and natural polymer compounds.

Examples of the synthetic resins include polyester resins, polyurethane resins, polyepoxy resins, polyamide resins, polyether resins, poly(meth)acrylic resins, acryl-silicone resins, fluorine-based resins, polyolefin resins, polystyrene-based resins, polybutadiene-based resins, polyvinyl acetate-based resins, polyvinyl alcohol-based resins, polyvinyl ester-based resins, polyvinyl chloride-based resins, polyacrylic acid-based resins, unsaturated carboxylic acid-based resins and copolymers such as styrene-acrylate copolymer resins, styrene-butadiene copolymer resins, and combinations of the plural.

Examples of the natural polymer compounds include celluloses, rosins, and natural rubbers.

Examples of commercially available water-dispersed resin emulsions include: Joncryl 537 and 7640 (styrene-acrylic resin emulsion, made by Johnson Polymer Co., Ltd.), Microgel E-1002 and E-5002 (styrene-acrylic resin emulsion, made by Nippon Paint Co., Ltd.), Voncoat 4001 (acrylic resin emulsion, made by Dainippon Ink and Chemicals Co., Ltd.), Voncoat 5454 (styrene-acrylic resin emulsion, made by Dainippon Ink and Chemicals Co., Ltd.), SAE-1014 (styrene-acrylic resin emulsion, made by Zeon Japan Co., Ltd.), Jurymer ET-410 (acrylic resin emulsion, made by Nihon Junyaku Co., Ltd.), Aron HD-5 and A-104 (acrylic resin emulsion, made by Toa Gosei Co., Ltd.), Saibinol SK-200 (acrylic resin emulsion, made by Saiden Chemical Industry Co., Ltd.), and Zaikthene L (acrylic resin emulsion, made by Sumitomo Seika Chemicals Co., Ltd.), acrylic copolymer emulsions of DSM Neoresins, e.g. the NeoCryl product line, in particular acrylic styrene copolymer emulsions NeoCryl A-662, NeoCryl A-1131, NeoCryl A-2091, NeoCryl A-550, NeoCryl BT-101, NeoCryl SR-270, NeoCryl XK-52, NeoCryl XK-39, NeoCryl A-1044, NeoCryl A-1049, NeoCryl A-1110, NeoCryl A-1120, NeoCryl A-1127, NeoCryl A-2092, NeoCryl A-2099, NeoCryl A-308, NeoCryl A-45, NeoCryl A-615, NeoCryl BT-24, NeoCryl BT-26, NeoCryl BT-26, NeoCryl XK-15, NeoCryl X-151, NeoCryl XK-232, NeoCryl XK-234, NeoCryl XK-237, NeoCryl XK-238-NeoCryl XK-86, NeoCryl XK-90 and NeoCryl XK-95, polyester-polyurethane resins, such as Alberdingk® U 6100, U6150, U8001, U9150, U9370, U9380, U9700, U 9800, UC90, UC150, UC300, UC300 VP or UC310 resin obtainable from Alberdingk Boley GmbH. However, the water-dispersed resin emulsion is not limited to these examples.

The water-dispersed resin may be used in the form of a homopolymer, a copolymer or a composite resin, and all of water-dispersed resins having a monophase structure or core-shell structure and those prepared by power-feed emulsion polymerization may be used.

The content of the water-dispersed resin added in the ink of the present invention is preferably from 3.5-40 weight % based on the total weight of the ink, and it is more preferably from 3.5-30 weight %, and it is still more preferably from 4-25 weight %. Even more preferably, the amount of the water-dispersed resin contained in the inkjet ink, as a solid content, is 4.5 weight % to 15 weight %, and more preferably 6 weight % to 13 weight %, such as 7.5-11 weight % relative to the total ink composition.

The water-dispersed resin may form a robust layer after drying of the ink, such as after drying after being applied onto a recording medium, thereby forming an image on the recording medium. If the content of the water-dispersed resin in the ink composition is lower than 3.5 weight %, based on the total weight of the ink, then no robust layer may be formed after printing. If the content of the water-dispersed resin in the ink composition is higher than 40 weight %, based on the total weight of the ink, then the amount of solids in the ink may be too high to allow stable jetting of the ink composition.

The average particle diameter (D50) of the water-dispersed resin is preferably from 10 nm-1 μm, it is more preferably from 10-500 nm, and it is still more preferably from 20-200 nm, and especially preferably it is from 25-200 nm.

In addition, there are no specific restrictions to the particle size distribution of the polymer particles, and it is possible that the polymer particles have a broad particle size distribution or the polymer particles have a particle size distribution of monodisperse type.

In an embodiment, the ink composition according to the present invention comprises two or more water-dispersed resins selected from the above cited synthetic resins, synthetic copolymer resins and natural polymer compounds in admixture with each other.

Water-Dispersible Colorant

A water-dispersible colorant may be a pigment or a mixture of pigments, a dye or a mixture of dyes or a mixture comprising pigments and dyes, as long as the colorant is water-dispersible or water dispersible.

In the inkjet ink according to the present invention, a pigment is primarily used as a water-dispersible colorant in view of the weatherability, and, for the purpose of controlling color tone, a dye may be contained within the range not impairing the weatherability. The pigment is not particularly limited and may be suitably selected in accordance with the intended use.

Examples of the pigment usable in the present invention include those commonly known without any limitation, and either a water-dispersible pigment or an oil-dispersible pigment is usable. For example, an organic pigment such as an insoluble pigment or a lake pigment, as well as an inorganic pigment such as carbon black, is preferably usable. The pigment may be a self dispersible pigment, or may be a pigment dispersed using a suitable dispersant, as is known in the art.

Examples of the insoluble pigments are not particularly limited, but preferred are an azo, azomethine, methine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, or diketopyrrolopyrrole dye.

For example, inorganic pigments and organic pigments for black and color inks are exemplified. These pigments may be used alone or in combination. As the inorganic pigments, it is possible to use carbon blacks produced by a known method such as a contact method, furnace method and thermal method, in addition to titanium oxide, iron oxide, calcium carbonate, barium sulfate, aluminum hydroxide, barium yellow, cadmium red and chrome yellow.

As the organic pigments, it is possible to use azo pigments (including azo lake, insoluble azo pigments, condensed pigments, chelate azo pigments and the like), polycyclic pigments (e.g., phthalocyanine pigments, perylene pigments, perynone pigments, anthraquinone pigments, quinacridone pigments, dioxazine pigments, indigo pigments, thioindigo pigments, isoindolinone pigments, and quinophthalone pigments), dye chelates (e.g., basic dye type chelates, and acidic dye type chelates), nitro pigments, nitroso pigments, aniline black. Among these, particularly, pigments having high affinity with water are preferably used.

Specific pigments which are preferably usable are listed below.

Examples of pigments for magenta or red include: C.I. Pigment Red 1, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 17, C.I. Pigment Red 22, C.I. Pigment Red 23, C.I. Pigment Red 31, C.I. Pigment Red 38, C.I. Pigment Red 48:1, C.I. Pigment Red 48:2 C.I. Pigment Red 48:3, C.I. Pigment Red 48:4, C.I. Pigment Red 49:1, C.I. Pigment Red 52:2; C.I. Pigment Red 53:1, C.I. Pigment Red 57:1 (Brilliant Carmine 6B), C.I. Pigment Red 60:1, C.I. Pigment Red 63:1, C.I. Pigment Red 64:1, C.I. Pigment Red 81. C.I. Pigment Red 83, C.I. Pigment Red 88, C.I. Pigment Red 101 (colcothar), C.I. Pigment Red 104, C.I. Pigment Red 106, C.I. Pigment Red 108 (Cadmium Red), C.I. Pigment Red 112, C.I. Pigment Red 114, C.I. Pigment Red 122 (Quinacridone Magenta), C.I. Pigment Red 123, C.I. Pigment Red 139, C.I. Pigment Red 44, C.I. Pigment Red 146, C.I. Pigment Red 149, C.I. Pigment Red 166, C.I. Pigment Red 168, C.I. Pigment Red 170, C.I. Pigment Red 172, C.I. Pigment Red 177, C.I. Pigment Red 178, C.I. Pigment Red 179, C.I. Pigment Red 185, C.I. Pigment Red 190, C.I. Pigment Red 193, C.I. Pigment Red 209, C.I. Pigment Red 219 and C.I. Pigment Red 222, C.I. Pigment Violet 1 (Rhodamine Lake), C.I. Pigment Violet 3, C.I. Pigment Violet 5:1, C.I. Pigment Violet 16, C.I. Pigment Violet 19, C.I. Pigment Violet 23 and C.I. Pigment Violet 38.

Examples of pigments for orange or yellow include: C.I. Pigment Yellow 1, C.I. Pigment Yellow 3, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 17, C.I. Pigment Yellow 24, C.I. Pigment Yellow 34, C.I. Pigment Yellow 35, C.I. Pigment Yellow 37, C.I. Pigment Yellow 42 (yellow iron oxides), C.I. Pigment Yellow 53, C.I. Pigment Yellow 55, C.I. Pigment Yellow 74, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 100, C.I. Pigment Yellow 101, C.I. Pigment Yellow 104, C.I. Pigment Yellow 408, C.I. Pigment Yellow 109, C.I. Pigment Yellow 110, C.I. Pigment Yellow 117, C.I. Pigment Yellow 120, C.I. Pigment Yellow 128, C.I. Pigment Yellow 138, C.I. Pigment Yellow 150, C.I. Pigment Yellow 151, C.I. Pigment Yellow 153 and C.I. Pigment Yellow 183; C.I. Pigment Orange 5, C.I. Pigment Orange 13, C.I. Pigment Orange 16, C.I. Pigment Orange 17, C.I. Pigment Orange 31, C.I. Pigment Orange 34, C.I. Pigment Orange 36, C.I. Pigment Orange 43, and C.I. Pigment Orange 51.

Examples of pigments for green or cyan include: C.I. Pigment Blue 1, C.I. Pigment Blue 2, C.I. Pigment Blue 15, C.I. Pigment Blue 15:1, C.I. Pigment Blue 15:2, C.I. Pigment Blue 15:3 (Phthalocyanine Blue), C.I. Pigment Blue 16, C.I. Pigment Blue 17:1, C.I. Pigment Blue 56, C.I. Pigment Blue 60, C.I. Pigment Blue 63, C.I. Pigment Green 1, C.I. Pigment Green 4, C.I. Pigment Green 7, C.I. Pigment Green 8, C.I. Pigment Green 10, C.I. Pigment Green 17, C.I. Pigment Green 18 and C.I. Pigment Green 36.

In addition to the above pigments, when red, green, blue or intermediate colors are required, it is preferable that the following pigments are employed individually or in combination thereof. Examples of employable pigments include: C.I. Pigment Red 209, 224, 177, and 194, C.I. Pigment Orange 43, C.I. Vat Violet 3, C.I. Pigment Violet 19, 23, and 37, C.I. Pigment Green 36, and 7, C.I. Pigment Blue 15:6.

Further, examples of pigments for black include: C.I. Pigment Black 1, C.I. Pigment Black 6, C.I. Pigment Black 7 and C.I. Pigment Black 11. Specific examples of pigments for black color ink usable in the present invention include carbon blacks (e.g., furnace black, lamp black, acetylene black, and channel black); (CA. Pigment Black 7) or metal-based pigments (e.g., copper, iron (C.I. Pigment Black 11), and titanium oxide; and organic pigments (e.g., aniline black (C.I. Pigment Black 1).

Cyclodextrin Compound

The ink composition may further comprise a cyclodextrin compound. Cyclodextrin compounds, also known as cyclodextrines, are cyclic compounds, i.e. cyclic oligosaccharides. Cyclodextrines form a basic skeleton formed by bonding a plurality of α-1,4 linked α-D-glucopyranose units. Optionally, the α-D-glucopyranose units may comprise one or more substituents, such as alkyl substituents, hydroxyl alkyl substituents, polymer substituents, sugar substituents or sugarpolymer substituents.

Examples of alkyl substituents are methyl, ethyl, propyl, butyl, etc. Examples of hydroxyl alkyl substituents are methoxy, ethoxy, propoxy, butoxy, etc. Examples of polymer substituents are polyether, polyester and poly-THF substituents. In the context of the invention, cyclodextrines include both non-substituted cyclodextrine molecules and substituted cyclodextrines. Cyclodextrines consisting of 6 glucose molecules are known as α-cyclodextrines; cyclodextrines comprising 7, 8 or 9 glucose molecules are known as β-cyclodextrines, γ-cyclodextrines and δ-cyclodextrines, respectively.

The cyclodextrines have a structure, wherein a cavity is formed. The cavity has a lipophilic nature. The outer surface of the cyclodextrine is hydrophilic. Because of this hydrophilic outer surface, cyclodextrines are water soluble.

In this lipophilic cavity, small molecules can bind. The size of the cavity depends on the number of α-D-glucopyranose units that form the cyclodextrine. For example, the cavity of an α-cyclodextrine is smaller than the cavity of a β-cyclodextrine, which is smaller than the cavity of a γ-cyclodextrine, etc.

In the cavity of the cyclodextrine, molecules may be incorporated which have a size smaller than the inner diameter of the cyclodextrine (which corresponds to the diameter of the cavity). Binding of the small molecule, which is also known in the art as the guest molecule, may result in the formation of a supramolecular complex between the cyclodextrine and the guest molecule. The formation of the supramolecular complex may be reversible; i.e. the small molecule may bind inside the cavity of the cyclodextrine and may dissociate from the cavity. The supramolecular complex and the individual components may be in equilibrium, as is shown in formula 2.

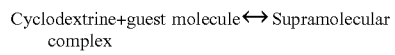

Cyclodextrine+guest molecule ⟷ Supramolecular complex    Formula 2

The position of the equilibrium may depend e.g. on the size of the guest molecule, the chemical nature of the guest molecule, and the concentration of the cyclodextrine and the guest molecule. The higher the concentration of the cyclodextrine and the guest molecule, the more the equilibrium will shift to the right.

It was found that addition of a cyclodextrin compound to an ink composition comprising a co-solvent, wherein the co-solvent is selected from the group consisting of saccharides and co-solvents comprising a ring structure, wherein the ring structure comprises a 5-membered, a 6-membered or a 7-membered ring, improves drying of the ink composition after application of the ink onto a receiving medium. Without wanting to be bound to any theory, this is believed to be caused by reversibly binding of the co-solvent in the cavity of the cyclodextrin, thereby forming a cyclodextrin-co-solvent complex.

When the ink has not yet dried, for example when the ink is still in the print head, the concentration of the cyclodextrin and the co-solvent may be relatively low and consequently, the equilibrium may lie to the left. Thus, only little co-solvent may be bound in the cavity of the cyclodextrin and most of the co-solvent may be dissolved in the aqueous liquid vehicle of the ink composition, not bound to the cyclodextrin compound. In this state, which will be referred to hereinafter as the unbound state, the co-solvent may e.g. stabilize the particles dispersed in the ink composition and modify the viscosity and/or surface tension of the ink composition. This is important to maintain jetstability.

After the ink has been applied onto the receiving medium, water may start to evaporate from the ink composition, thereby increasing the concentration of both the co-solvent and the cyclodextrine. This increase in concentration may shift the equilibrium to the right and more co-solvent may be incorporated into the cavity of the cyclodextrine, forming the supramolecular complex. When the co-solvent is bound in the cyclodextrine cavity, it may no longer stabilize particles dispersed in the ink composition. However, when ink is drying, this need not be a problem. Furthermore, in case the co-solvent has a hygroscopic character, binding of the co-solvent in the cyclodextrine cavity may decrease the hygroscopic character of the co-solvent. When the hygroscopic character is lost, it may no longer retain water in the drying ink composition, thereby allowing the ink composition to dry faster. Saccharides, for example are known to have a hygroscopic character.

Thus, whereas co-solvent in the unbound state may bind water, co-solvent bound in the cavity of cyclodextrine may not retain water anymore. Therefore, it may be easier to remove the last traces of water from a drying ink comprising co-solvent and cyclodextrine compared to an ink comprising the co-solvent, but not the cyclodextrine. Preferably, the cyclodextrine may be compatible with a large range of water dispersed resins, as a result of which the cyclodextrine and or the supramolecular cyclodextrine-isosorbide may be incorporated in the resin film formed upon drying of the ink.

The cyclodextrine may be present in an amount of from 0.1 wt % to 10 wt % based on the total ink composition.

In an embodiment, the cyclodextrine is a β-cyclodextrine. Addition of β-cyclodextrine to an ink composition according to the present invention shows the strongest improvement regarding drying time, compared to other types of cyclodextrine. This is believed to be caused by the size of the cavity of the β-cyclodextrine, which is believed to be optimal for accommodating saccharides, such as isosorbide.

In an embodiment, the water-dispersed resin is present in an amount of 80 wt % or more based on the amount of the cyclodextrin compound. The water-dispersed resin and the cyclodextrin compound may be compatible with one another. When ink dries on the receiving medium, the water-dispersed resin may form a film. This film may protect the image and may improve the robustness of the print. Cyclodextrin compounds may not hamper film formation of the water-dispersed resin. Hence, prints made with inks comprising a cyclodextrin compound and a water-dispersed resin may provide robust images.

In case the water-dispersed resin is present in less than 80 wt % based on the amount of the cyclodextrin compound, then too little water-dispersed resin may be present to form a film of resin on the receiving medium.

Co-Solvent

The ink composition may comprise a co-solvent. Co-solvents may tune the properties of the ink (e.g. viscosity and polarity) and may assist in stabilize the particles in the ink, such as the water-dispersed resin particles and the water-dispersible pigment particles. The co-solvent should be miscible with the ink vehicle. The ink vehicle is formed by the water present in the ink and optional additional co-solvents present in the ink composition. Preferably, the co-solvent is soluble in water.

The co-solvent may be selected from the group consisting of saccharides and co-solvents comprising a ring structure, wherein the ring structure comprises a 5-membered, a six-membered or a 7-membered ring. The co-solvents comprising a ring structure, wherein the ring structure comprises a 5-membered, a 6-membered or a 7-membered ring, may be different from a saccharide. Co-solvents that are part of the above-mentioned group may function as a guest molecule and may bond in the cavity of the cyclodextrin compound, thereby forming a supramolecular complex between the co-solvent and the cyclodextrin compound.

Non-limiting examples of co-solvents comprising a 5-membered ring are cyclopentane, furan, tetrahydrofuran, pyrrole, pyrrolidine, 2-pyrrolidone, imidazole, imidazoline, cyclopentanone and thiophene. Examples of co-solvents comprising a 6-membered ring are cyclohexane, cyclohexene, benzene, naphthalene, toluene, cyclohexanone, pyridine, piperidine, phosphinine, tetrahydropyran, morpholine, thiomorpholine and dioxane. Examples of co-solvents comprising a 7-membered ring are caprolactone, caprolactam, cycloheptane, cycloheptene, cycloheptanone, azepane, oxepane and thiephane. The rings may be substituted. For example, the ring structure may comprise an alkyl, a hydroxyl or alkoxy substituent. Alternatively or additionally, the ring structure may comprise a carbonyl group. Alternatively, or additionally, the rings may be substituted with an ester group, an ether group, an amide group, a carboxylic ester group.

The co-solvent may further be selected from the group of saccharides. Non-limiting examples of saccharides are monosaccharides, disaccharides, trisaccharides and polysaccharides. In the context of the present invention, the term saccharides should be interpreted as including saccharide derivatives.

Examples of monosaccharides are threose, erythrulose, erythrose, arabinose, ribulose, ribose, xylose, xylulose, lyxose, glucose, fructose, mannose, idose, sorbose, gulose, talose, tagatose, galactose, allose, psicose, altrose. Examples of saccharide derivatives comprise cyclized saccharides; deoxygenized saccharides, such as deoxyribose; condensation products of a saccharide and an aldehyde, such as formaldehyde or acetaldehyde; esterification products of a saccharide and an organic acid, such as acetic acid; etherification products of a saccharide and alcohol; and hydrogenated saccharides and cyclization products of said hydrogenated saccharides. Examples of such cylization products are sorbitan and isosorbide. Saccharides according to the present invention further include etherification products of said cyclized products, such as di-methylisosorbide.

Saccharides and co-solvents comprising a ring structure, wherein the ring structure comprises a 5-membered, a 6-membered or a 7-membered ring are believed to be able to bind to a cyclodextrin compound, thereby forming a cyclodextrin-co-solvent complex.

Examples of disaccharides are maltose, isomaltose, cellobiose, lactose, sucrose, trehalose, isotrehalose, gentiobioge, melibiose, turanose, sophorose and isosaccharose.

Examples of polysaccharides include homoglycans (such as glucan, fructan, mannan, xylan, galacturonane, mannuronane, and N-acetylglucosamine polymer); and heteroglycans (such as diheteroglycan and triheteroglycan); for example maltotriose, isomaltotriose, panose, maltotetraose, maltopentaose.

The ink composition according to the present invention may comprise one co-solvent or a plurality of co-solvents. For example, the ink composition may comprise one saccharide or a mixture of saccharides. Alternatively or additionally, the ink composition may comprise at least one co-solvents comprising a ring structure, wherein the ring structure comprises a 5-membered, a 6-membered or a 7-membered ring.

The co-solvent may be present in an amount of from 0.1 wt % to 30 wt %, based on the total ink composition. Preferably, co-solvent may be present in an amount of from 0.3 wt % to 15 wt %. If the amount of co-solvent is too low, e.g. lower than 0.1 wt %, then water may evaporate too fast and/or the solid particles in the ink may not be stabilized enough anymore, resulting in the formation of precipitations. If the amount of co-solvent is too high, e.g. higher than 30 wt %, the drying of the film after printing becomes troublesome.

In an embodiment, the water dispersed-resin is compatible with the co-solvent and the cyclodextrin compound. As mentioned above, the water-dispersed resin is preferably compatible with the cyclodextrin compound, to allow film formation upon drying of the ink on the receiving medium. The co-solvent and the water-dispersed resin may be compatible. The water-dispersed resin may be stably dispersed in the ink vehicle comprising water and at least one co-solvent.

In an embodiment, the co-solvent is a saccharide. Saccharides are natural products. Hence, using a saccharide as a co-solvent may provide an environmentally friendly ink. Moreover, using saccharides as a co-solvent is also beneficial from a health point of view. Saccharides, comprising carbohydrates or derivatives thereof, generally comprise a plurality of —OH (hydroxyl) functional groups. Because of these hydroxyl functional groups, saccharides are generally water soluble and may therefore be applied as co-solvent in an aqueous ink. Furthermore, the hydroxyl functional groups may form hydrogen bridges with particles present in the ink, such as water-dispersed resin particles and pigment particles, thereby assisting in stabilizing these particles.

Saccharides are generally solid at room temperature. Compounds that are solid at room temperature, but that—when dissolved in an aqueous medium— act as a solvent are known as "solid solvents". An advantage of using a solid solvent is that the solvent does not need to evaporate upon drying of the ink, which is energy efficient.

In a further embodiment, the saccharide is selected from the group comprising a mono-saccharide, a disaccharide and a trisaccharide. In the context of the invention, saccharides, such as monosaccharides, include saccharide derivatives, such as hydrogenated saccharides, esterified saccharides and cyclization products of hydrogenated saccharides.

These saccharides may be well soluble in water. In addition, they may bond well to the cavity of a cyclodextrin compound, thereby forming a cyclodextrin-saccharide complex.

Isosorbide

In an embodiment, the ink composition may comprises isosorbide as co-solvent. Isosorbide is also known as dianhydroglucitol or dianhydrosorbitol. Isosorbide is an example of a cyclization product of a hydrogenated saccharide. Instead of, or in addition to isosorbide, an alternative cyclization product of a hydrogenated saccharide may be used, for example sorbitan.

The molecular structure of isosorbide is shown in Formula 1.

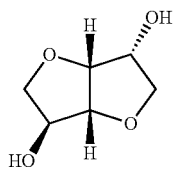

Formula 1

Isosorbide may be derived from glucose and is therefore a renewable, bio-based resource, suitable for composing ink compositions. Isosorbide is a solid at ambient condition. Although it is solid, it is useful as a (solid) co-solvent in aqueous ink compositions, for example because of its high solubility in water and its hygroscopic character.

When an ink composition is applied onto a receiving medium, ink has to dry. Generally, ink is dried by evaporating the liquid vehicle of the ink and/or by absorbing the liquid vehicle in by the receiving medium. However, when an image is applied onto a non-absorbing medium or a weakly absorbing medium, the ink cannot be absorbed such that the ink is dried efficiently. The liquid vehicle may then be removed by evaporation, but this is energy consuming and may take a long time.

In case an image is applied using an ink comprising solid solvents, the ink may be dried by solidification of the solid solvent. However, in that case, the solid solvent is not removed from the printed image and may negatively influence the properties of the printed image, such as the visual aspect of the printed image and/or the robustness of the printed image. This may result e.g. from incompatibility of the solid solvent and the water dispersed resin.

Isosorbide is compatible with a wide range of lattices and as a result, the isosorbide may be incorporated in the layer formed on the receiving medium by the water-dispersed resin. Thus, the image provided onto the receiving medium may dry without the isosorbide co-solvent being evaporated.

Isosorbide may form an amorphous solid when drying. As a consequence, no or little isosorbide crystals may be formed. The absence of co-solvent crystals may have a beneficial effect on the print quality of the printed image.

In addition of the above mentioned advantages of using isosorbide as a co-solvent, using isosorbide may have additional advantages. In an ink comprising a cyclodextrin compound, e.g. an ink composition according to the present invention, the isosorbide may bond in the cavity of the cyclodextrin compound, thereby forming an supramolecular isosorbide-cyclodextrin complex. This may even further increase the rate of drying of the ink composition.

The ink composition may comprise further components, such as dispersants for dispersing the water dispersed resin or the water dispersible colorant, a humectant and a surfactant.

Examples of the surfactant include nonionic surfactants, cationic surfactants, anionic surfactants, amphoteric surfactants, in particular betaine surfactants, silicone surfactants, and fluorochemical surfactants. Particularly, at least one selected from acetylene surfactants, silicone surfactants and fluorochemical surfactants capable of reducing the static surface tension to 40 mN/m or lower is preferably used.

In an embodiment, the co-solvent and the cyclodextrine are present in a molar ratio of from 1:20 to 20:1. The ratio between the co-solvent and the cyclodextrine may influence the properties of the ink before jetting (for example in the print head) as well as after jetting, such as during drying.

If the co-solvent and the cyclodextrine are present in a molar ratio less than 1:20, then insufficient co-solvent may be present. Moreover, even before drying of the ink, a relatively large amount of co-solvent may be bonded to the cyclodextrin compound. The co-solvent may be required to tune the properties of the ink, to prevent drying of the ink in the nozzle and to stabilize particles that are dispersed in the ink. If the co-solvent and the cyclodextrine are present in a molar ratio more than 20:1, then too much co-solvent may be present. The amount of co-solvent with respect to the amount of cyclodextrin compound may be such that only a (small) percentage of the co-solvent present in the ink can bond to the cyclodextrin compound upon drying. This may slow down drying of the ink and may increase the energy needed to dry the printed image.

In an embodiment, the co-solvent is 2-pyrrolidone. 2-Pyrrolidone may be used to soften the surface of certain types of recording media, for example vinyl media. By using 2-pyrrolidone as co-solvent, the surface of the recording media may be softened when applying the ink, thereby improving the adhesion of the printed image to the surface. When the ink dries, the 2-pyrrolidone may bind to the cyclodextrin compound, which may result in faster drying and decreased energy consumption when drying the ink.

In an aspect of the invention, a method for preparing an ink composition comprising a water-dispersed resin, a water dispersible colorant, water and a co-solvent is provided, the method comprising the steps of:
  providing water;
  adding a co-solvent upon stirring, wherein the co-solvent is selected from the group consisting of saccharides and co-solvents comprising a ring structure, wherein the ring structure comprises a 5-membered, a 6-membered or a 7-membered ring;
  adding a cyclodextrin compound upon stirring;
  adding an aqueous dispersion of the water dispersed resin and an aqueous dispersion of the water dispersible colorant.

If the ink composition comprises a surfactant, the surfactant may be added before the aqueous dispersions are added.

In a further aspect of the invention, a method for applying an image onto a receiving medium by applying droplets of an ink composition comprising a water-dispersed resin, a water dispersible colorant, water, a cyclodextrine compound and a co-solvent, wherein the co-solvent is selected from the group consisting of saccharides and co-solvents comprising a ring structure, wherein the ring structure comprises a 5-membered, a 6-membered or a 7-membered ring is provided, the method comprising the steps of:
  a. providing the ink composition to an ink reservoir of a inkjet printer;
  b. jetting droplets of the ink composition onto a receiving medium;
  c. allowing the ink composition to dry on the receiving medium, the ink composition thereby providing a solid film on the receiving medium.

The ink composition may be provided to an ink reservoir of an ink jet printer. Droplets of the ink may be jetted by the ink jet printer onto a receiving medium. When jetting the droplets of ink into the receiving medium, the droplets of ink may be in a fluid state. For example, co-solvents may be dissolved in the aqueous vehicle of the ink composition. When the droplets of the ink composition have been applied onto the receiving medium, thereby forming an image on the receiving medium, the ink may dry and thereby provide a solid film on the receiving medium. The ink composition may dry by removal of the volatile components of the aqueous vehicle, such as water and optionally volatile co-solvents. The volatile components may be removed by evaporation. Evaporation may take place under ambient conditions, or the receiving medium provided with the ink composition may be heated and/or an airflow may be applied to the receiving medium in order to increase the rate of evaporation. Optionally, a part of the aqueous vehicle may also be absorbed by the receiving medium. When the aqueous vehicle is removed, the concentration of the solid components, such as the dispersed resin, the pigment and the cyclodextrin compound, increases. Co-solvents may have a higher boiling point than water. When the ink dries, water will evaporate at a higher rate than the co-solvents. Hence, also the concentration of co-solvents may increase when the ink dries. If solid co-solvents are used, then the co-solvents may not evaporate, but at a certain point, these components will precipitate. The solid components may then together form a solid film on the receiving medium.

DETAILED DESCRIPTION OF THE DRAWINGS

Figure 1:
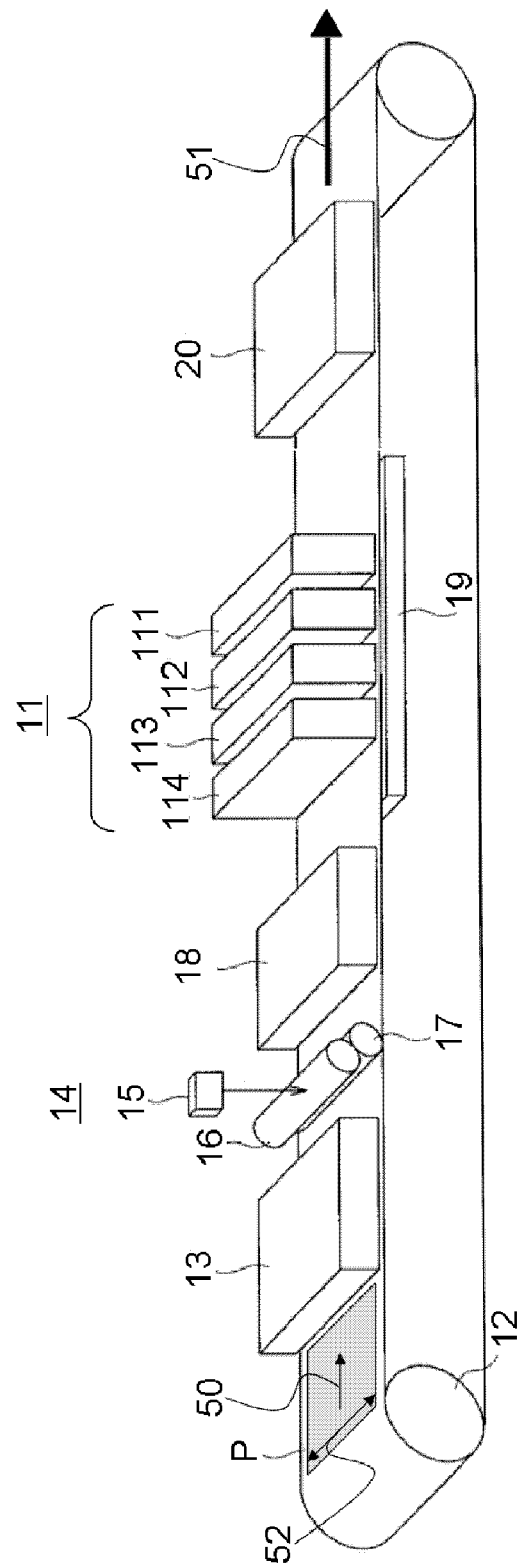
FIG. 1 shows a schematic representation of an inkjet printing system.

In the drawings, same reference numerals refer to same elements.

A printing process in which the inks according to the present invention may be suitably used is described with reference to the appended drawings shown in FIG. 1 and FIG. 2A-C. FIGS. 1 and 2A-C show schematic representations of an inkjet printing system and an inkjet marking device, respectively.

FIG. 1 shows a sheet of a receiving medium P. The image receiving medium P may be composed of e.g. paper, cardboard, label stock, coated paper, plastic, machine coated paper or textile. Alternatively, the receiving medium may be a medium in web form (not shown). The medium, P, is transported in a direction for conveyance as indicated by arrows 50 and 51 and with the aid of transportation mechanism 12. Transportation mechanism 12 may be a driven belt system comprising one (as shown in FIG. 1) or more belts. Alternatively, one or more of these belts may be exchanged for one or more drums. A transportation mechanism may be suitably configured depending on the requirements (e.g. sheet registration accuracy) of the sheet transportation in each step of the printing process and may hence comprise one or more driven belts and/or one or more drums. For a proper conveyance of the sheets of receiving medium, the sheets need to be fixed to the transportation mechanism. The way of fixation is not particularly limited and may be selected from electrostatic fixation, mechanical fixation (e.g. clamping) and vacuum fixation. Of these, vacuum fixation is preferred.

The printing process as described below comprises of the following steps: media pre-treatment, image formation, drying and fixing and optionally post treatment.

FIG. 1 shows that the sheet of receiving medium P may be conveyed to and passed through a first pre-treatment module 13, which module may comprise a preheater, for example a radiation heater, a corona/plasma treatment unit, a gaseous acid treatment unit or a combination of any of the above. Optionally and subsequently, a predetermined quantity of the pre-treatment liquid is applied on the surface of the receiving medium P at pre-treatment liquid applying member 14. Specifically, the pre-treatment liquid is provided from storage tank 15 of the pre-treatment liquid to the pre-treatment liquid applying member 14 composed of double rolls 16 and 17. Each surface of the double rolls may be covered with a porous resin material such as sponge. After providing the pre-treatment liquid to auxiliary roll 16 first, the pre-treatment liquid is transferred to main roll 17, and a predetermined quantity is applied on the surface of the receiving medium P. Subsequently, the image receiving medium P on which the pre-treatment liquid was supplied may optionally be heated and dried by drying member 18 which is composed of a drying heater installed at the downstream position of the pre-treatment liquid applying member 14 in order to decrease the quantity of the water content in the pre-treatment liquid to a predetermined range. It is preferable to decrease the water content in an amount of 1.0 weight % to 30 weight % based on the total water content in the provided pre-treatment liquid provided on the receiving medium P.

To prevent the transportation mechanism 12 being contaminated with pre-treatment liquid, a cleaning unit (not shown) may be installed and/or the transportation mechanism may be comprised of multiple belts or drums as described above. The latter measure prevents contamination of the upstream parts of the transportation mechanism, in particular of the transportation mechanism in the printing region.

Image Formation

Image formation is performed in such a manner that, employing an inkjet printer loaded with inkjet inks, ink droplets are ejected from the inkjet heads based on the digital signals onto a print medium. The inkjet inks may be ink jet inks according to the present invention.

Although both single pass inkjet printing and multi pass (i.e. scanning) inkjet printing may be used for image formation, single pass inkjet printing is preferably used since it is effective to perform high-speed printing. Single pass inkjet printing is an inkjet recording method with which ink droplets are deposited onto the receiving medium to form all pixels of the image by a single passage of a receiving medium underneath an inkjet marking module.

In FIG. 1, 11 represents an inkjet marking module comprising four inkjet marking devices, indicated with 111, 112, 113 and 114, each arranged to eject an ink of a different color (e.g. Cyan, Magenta, Yellow and blacK). The nozzle pitch of each head is e.g. about 360 dpi. In the present invention, "dpi" indicates a dot number per 2.54 cm.

Figure 2A:
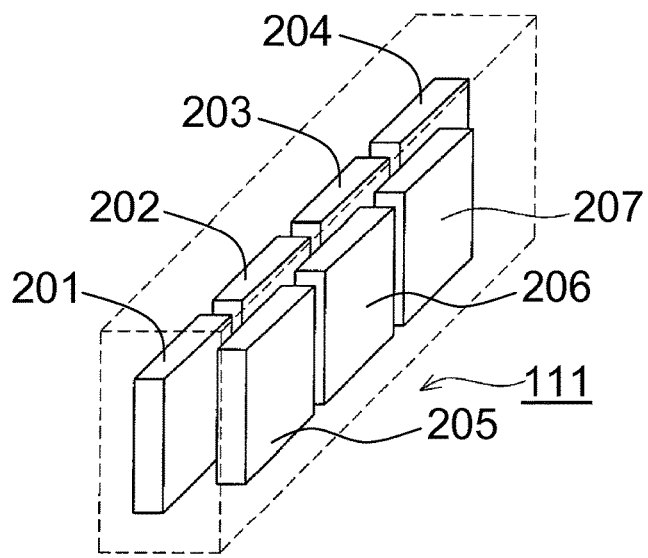
FIGS. 2A-2C show a schematic representation of an inkjet marking device: Fig. A) and Fig. B) assembly of inkjet heads; Fig. C) detailed view of a part of the assembly of inkjet heads.
Figure 2B:
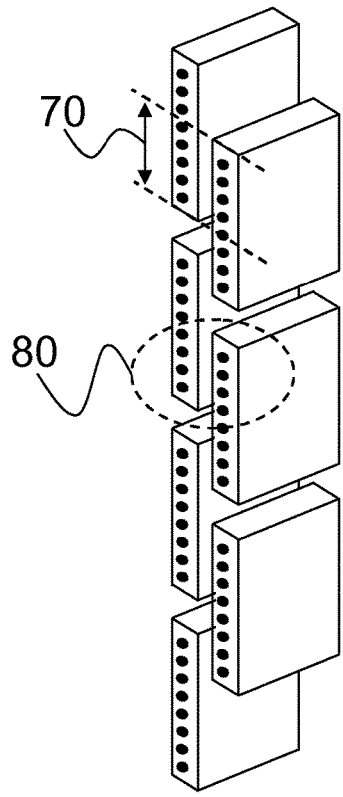
Figure 2C:
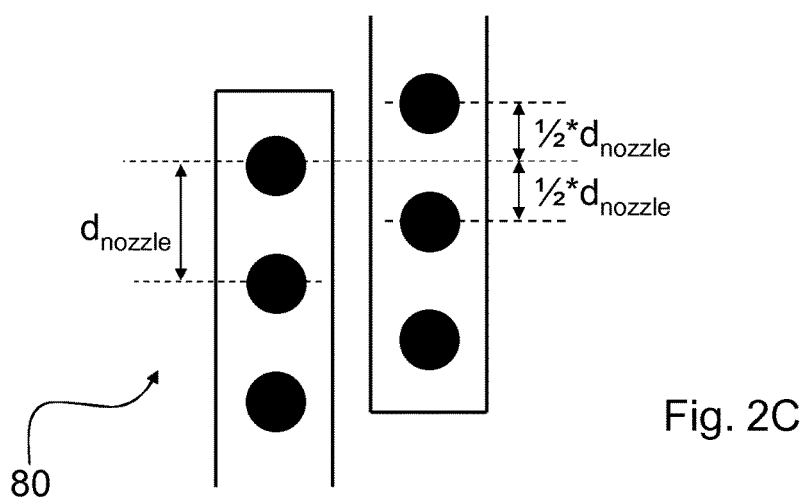

An inkjet marking device for use in single pass inkjet printing, 111, 112, 113, 114, has a length, L, of at least the width of the desired printing range, indicated with double arrow 52, the printing range being perpendicular to the media transport direction, indicated with arrows 50 and 51. The inkjet marking device may comprise a single print head having a length of at least the width of said desired printing range. The inkjet marking device may also be constructed by combining two or more inkjet heads, such that the combined lengths of the individual inkjet heads cover the entire width of the printing range. Such a constructed inkjet marking device is also termed a page wide array (PWA) of print heads. FIG. 2A shows an inkjet marking device 111 (112, 113, 114 may be identical) comprising 7 individual inkjet heads (201, 202, 203, 204, 205, 206, 207) which are arranged in two parallel rows, a first row comprising four inkjet heads (201-204) and a second row comprising three inkjet heads (205-207) which are arranged in a staggered configuration with respect to the inkjet heads of the first row. The staggered arrangement provides a page wide array of nozzles which are substantially equidistant in the length direction of the inkjet marking device. The staggered configuration may also provide a redundancy of nozzles in the area where the inkjet heads of the first row and the second row overlap, see 70 in FIG. 2B. Staggering may further be used to decrease the nozzle pitch (hence increasing the print resolution) in the length direction of the inkjet marking device, e.g. by arranging the second row of inkjet heads such that the positions of the nozzles of the inkjet heads of the second row are shifted in the length direction of the inkjet marking device by half the nozzle pitch, the nozzle pitch being the distance between adjacent nozzles in an inkjet head, $d_{nozzle}$ (see FIG. 2C, which represents a detailed view of 80 in FIG. 2B). The resolution may be further increased by using more rows of inkjet heads, each of which are arranged such that the positions of the nozzles of each row are shifted in the length direction with respect to the positions of the nozzles of all other rows.

In image formation by ejecting an ink, an inkjet head (i.e. print head) employed may be either an on-demand type or a continuous type inkjet head. As an ink ejection system, there may be usable either the electric-mechanical conversion system (e.g., a single-cavity type, a double-cavity type, a bender type, a piston type, a shear mode type, or a shared wall type), or an electric-thermal conversion system (e.g., a thermal inkjet type, or a Bubble Jet type (registered trade name)). Among them, it is preferable to use a piezo type inkjet recording head which has nozzles of a diameter of 30 µm or less in the current image forming method.

FIG. 1 shows that after pre-treatment, the receiving medium P is conveyed to upstream part of the inkjet marking module 11. Then, image formation is carried out by each color ink ejecting from each inkjet marking device 111, 112, 113 and 114 arranged so that the whole width of the image receiving medium P is covered.

Optionally, the image formation may be carried out while the receiving medium is temperature controlled. For this purpose a temperature control device 19 may be arranged to control the temperature of the surface of the transportation mechanism (e.g. belt or drum) underneath the inkjet marking module 11. The temperature control device 19 may be used to control the surface temperature of the receiving medium P, for example in the range of 10° C. to 125° C. The temperature control device 19 may comprise heaters, such as radiation heaters, and a cooling means, for example a cold blast, in order to control the surface temperature of the receiving medium within said range. Subsequently and while printing, the receiving medium P is conveyed to the downstream part of the inkjet marking module 11.

Drying and Fixing

After an image has been formed on the receiving medium, the prints have to be dried and the image has to be fixed onto the receiving medium. Drying comprises the evaporation of solvents, in particular those solvents that have poor absorption characteristics with respect to the selected receiving medium.

FIG. 1 schematically shows a drying and fixing unit 20, which may comprise a heater, for example a radiation heater. After an image has been formed, the print is conveyed to and passed through the drying and fixing unit 20. The print is heated such that solvents present in the printed image, such as water and/or organic co-solvents, evaporate. The speed of evaporation and hence drying may be enhanced by increasing the air refresh rate in the drying and fixing unit 20. Simultaneously, film formation of the ink occurs, because the prints are heated to a temperature above the minimum film formation temperature (MFFT). The residence time of the print in the drying and fixing unit 20 and the temperature at which the drying and fixing unit 20 operates are optimized, such that when the print leaves the drying and fixing unit 20 a dry and robust print has been obtained. As described above, the transportation mechanism 12 in the fixing and drying unit 20 may be separated from the transportation mechanism of the pre-treatment and printing section of the printing apparatus and may comprise a belt or a drum.

Post Treatment

To increase the print robustness or other properties of a print, such as gloss level, the print may be post treated, which is an optional step in the printing process. For example, the prints may be post treated by laminating the prints. Alternatively, the post-treatment step comprises a step of applying (e.g. by jetting) a post-treatment liquid onto the surface of the coating layer, onto which the inkjet ink has been applied, so as to form a transparent protective layer on the printed recording medium.

Hitherto, the printing process was described such that the image formation step was performed in-line with the pre-treatment step (e.g. application of an (aqueous) pre-treatment liquid) and a drying and fixing step, all performed by the same apparatus (see FIG. 1). However, the printing process is not restricted to the above-mentioned embodiment. A method in which two or more machines are connected through a belt conveyor, drum conveyor or a roller, and the step of applying a pre-treatment liquid, the (optional) step of drying a coating solution, the step of ejecting an inkjet ink to form an image and the step or drying an fixing the printed image are performed. It is, however, preferable to carry out image formation with the above defined in-line image forming method.

EXPERIMENTS AND EXAMPLES

Materials

Latex A1127, an acrylic copolymer latex, was obtained from DSM Neoresins. Latex A662 was also obtained from DSM Neoresins. Latex U9800, a polyester polyurethane copolymer, was obtained from Alberdingk Boley GmbH. As a pigment, Pro-Jet™ Black APD 1000 was used, which is obtained from Fujifilm. As a wax, Michem Lube 190E was used, which is obtained from Michelman. Glycerol, isosorbide, D-(+)-Trehalose, D-Mannitol, 2-pyrrolidone, 1,2-hexanediol, 2,3-butanediol, pentaerythritol ethoxylate (3/4 OH), tetraethyleneglycol (TEG), Triton® X-100 propoxylated β-cyclodextrine, propoxylated α-cyclodextrin and maltodextrine were obtained from Sigma-Aldrich. As surfactants, Vantex® T, Dynol™ 607 and Tego® Wet 240 were used. Vantex® T and Dynol™ 607 were obtained from Taminco Air Products and Tego® Wet 240 was obtained from Evonik Industries AG.

All materials used in the examples are used as obtained from the supplier, unless otherwise stated.

Methods

Viscosity

The viscosity is measured using a Haake Rheometer, type Haake Rheostress RS 600, with a flat plate geometry at a temperature of 32° C. unless otherwise indicated. The viscosity is measured at a shear rate ($\dot{\gamma}$) of 10 s$^{-1}$.

Drying Time

Samples were made by rodcoating the ink composition onto a receiving medium (Hello Gloss (90 gr/m$^2$)) at room temperature to obtain a layer having a thickness of 14 μm. Once the droplets of ink were applied onto the receiving medium, the ink layer was wiped manually every 5 seconds using a rubber ball having a diameter of 1 cm. The moment when the rubber ball does not damage or smear the ink layer anymore, the ink layer is considered dry. Short drying times are preferred over long drying times.

Nozzle Open Time

The nozzle open time was determined by jetting ink compositions using a Dimatix print head (Jet Powered™, Model# DMC-11610/PN 700-10702-01). The droplets of ink that were jetted had a speed of 7 ms$^{-1}$. Ink compositions were jetted during 30 seconds. After the 30 second period of jetting, the nozzle was deactivated during a time interval. After this time interval, the print head was activated for another 30 seconds, etcetera. The duration of the time interval, at which the head was deactivated, was increased each time. The duration of the time intervals, at which the head was deactivated were 10, 20, 30, 60, 90, 120, 150, 180, 240, 270, 300, 330, 360, 390, 420, 480 and 540 seconds, respectively.

The maximal time-interval at which the nozzle showed good and stable jetting behavior after being activated, is the nozzle open time. Long nozzle open times are advantageous.

Fixation & Print Robustness

Samples were made by rodcoating the ink compositions onto UPM Finesse Gloss paper (115 gr m$^{-2}$) to obtain an ink layer having a thickness of 16 μm.

Subsequently, the samples were heated for 1 second. The samples were heated at various temperatures by leading them over a heated plate. After heating, the robustness of the prints was tested using the Wisch-test. In the Wisch test, a piece of plain paper is rubbed gently over the print. Afterwards, the piece of plain paper is inspected and it is judged visually whether (part of) the image was transferred from the sample to the piece of plain paper.

In a first test, the fixation temperature is determined. The fixation temperature is the minimum temperature at which no smearing takes place, i.e. when there is no ink transferred onto the piece of paper in the Wisch-test. In this test, the sample was heated for 1 second by leading the sample over a heated plate. The temperature of the plate was varied. Afterwards, the sample was allowed to cool down to room temperature. Subsequently, the Wisch-test was performed. The Fixation temperature is the minimum temperature of the heating plate, at which the image was not (partially) removed from the receiving medium in a corresponding Wisch-test. A low Fixation temperature is preferred over a high Fixation temperature.

In a second test, the samples were heated for 1 second to a temperature that is 20° C. higher than the Fixation temperature. After being heated, the samples were transferred to a second heated plate, were the samples were heated to a variety of temperatures. At these temperatures, the Wisch-test was carried out. No tests were carried out using a second heated plate that was heated to a temperature above 130° C. The maximum temperature of the second heated plate, at which the image was not (partially) removed from the receiving medium in a corresponding Wisch-test, is the maximal Wisch temperature ($T_{Wisch\ rob}$). A high maximal Wisch temperature is preferred over a low maximal Wisch temperature.

EXAMPLES

Several ink compositions were prepared. Ink compositions Ex 1, Ex 2, Ex 3, Ex 4, Ex 5, Ex 6 and Ex 7 are inks according to the present invention, whereas ink compositions CE 1, CE 2, CE 3, CE 4 and CE 5 are not ink compositions according to the present invention.

All ink compositions Ex 1-Ex 7 comprise a cyclodextrine compound. Ink compositions Ex 1-Ex 4 and Ex 6 comprise a saccharide. Ink compositions Ex 5 and Ex 7 comprise a co-solvent comprising a ring structure, wherein the ring structure comprises a 5-membered ring.

Production Example 1-7

Ink composition Ex 1 was prepared by adding 7.5 gr of pentaerythritolethoxylate, 8 gr of 2,3-butanediol and 1 gr of wax to water upon stirring at room temperature.

Subsequently, 5.0 gr of isosorbide and 2.5 gr of propoxylated β-cyclodextrin was added upon stirring. Next, 0.3 gr of Vantex-T, 0.8 gr of Dynol 607 and 0.4 gr of Tegowet 240 was added upon stirring.

Finally, an aqueous dispersion of Pro-Jet Black APD pigment was added upon stirring, as well as an aqueous dispersion of Latex A 662 and Latex U9800. The volume and concentrations of the dispersions was selected such that 3.85 gr of pigment, 6.1 gr of Latex A 662, 2.9 gr of Latex U9800 and 61.65 gr water was present per 100 gr of ink composition.

Furthermore, the amount of water present at the start of the preparation was selected such that 100 gr of ink composition Ex 1 was obtained.

Ink compositions Ex 2-Ex 7 were prepared analogously.

TABLE 1

Ink compositions Ex 1-Ex 7

| Component | Ex 1 | Ex 2 | Ex 3 | Ex 4 | Ex 5 | Ex 6 | Ex 7 |
| --- | --- | --- | --- | --- | --- | --- | --- |
| Latex A1127 | 0 | 0 | 0 | 0 | 9 | 5.9 | 5.9 |
| Latex U9800 | 2.9 | 2.9 | 2.9 | 2.9 | 0 | 2.8 | 2.8 |
| Latex A 662 | 6.1 | 6.1 | 6.1 | 6.1 | 0 | 0 | 0 |
| pigment | 3.85 | 3.85 | 3.85 | 3.85 | 4 | 3.85 | 3.85 |

TABLE 1-continued

Ink compositions Ex 1-Ex 7

| Component | Ex 1 | Ex 2 | Ex 3 | Ex 4 | Ex 5 | Ex 6 | Ex 7 |
|---|---|---|---|---|---|---|---|
| wax | 1.0 | 1.0 | 1.0 | 1.0 | 0 | 0.96 | 0.96 |
| glycerol | 0 | 0 | 0 | 0 | 0 | 9.6 | 9.6 |
| isosorbide | 5.0 | 5.0 | 0 | 0 | 0 | 4.8 | 0 |
| D-(+)-Trehalose | 0 | 0 | 5.0 | 0 | 0 | 0 | 0 |
| D-Mannitol | 0 | 0 | 0 | 5.0 | 0 | 0 | 0 |
| 2-Pyrrolidone | 0 | 0 | 0 | 0 | 9 | 0 | 4.8 |
| Propoxylated β-cyclodextrine | 2.5 | 0 | 2.5 | 2.5 | 2 | 2.4 | 2.4 |
| Propoxylates α-Cyclodextrin | 0 | 2.5 | 0 | 0 | 0 | 0 | 0 |
| 1,2-hexanediol | 0 | 0 | 0 | 0 | 4 | 0 | 0 |
| Triton X-100 | 0 | 0 | 0 | 0 | 0.5 | 0 | 0 |
| Vantex T | 0.3 | 0.3 | 0.3 | 0.3 | 0.5 | 0.29 | 0.29 |
| Dynol 607 | 0.8 | 0.8 | 0.8 | 0.8 | 0.3 | 0.77 | 0.77 |
| Tegowet 240 | 0.4 | 0.4 | 0.4 | 0.4 | 0 | 0.38 | 0.38 |
| 2,3-butanediol | 8.0 | 8.0 | 8.0 | 8.0 | 0 | 0 | 0 |
| Pentaerythritol ethoxylaat | 7.5 | 7.5 | 7.5 | 7.5 | 13 | 0 | 0 |
| TEG | 0 | 0 | 0 | 0 | 0 | 5.77 | 5.77 |
| water | 61.65 | 61.65 | 61.65 | 61.65 | 57.7 | 62.48 | 62.48 |
| Viscosity (mPa s) | 5.24 | 4.70 | nd | nd | 7.51 | 5.1 | nd | nd: not determined

COMPARATIVE EXAMPLES

Comparative Production Examples CE 1-CE 4

Ink composition CE 1 was prepared by adding 7.5 gr of pentaerythritolethoxylate, 8 gr of 2,3-butanediol and 1 gr of wax to water upon stirring at room temperature.

Subsequently, 5.0 gr of isosorbide and 2.5 gr of maltodextrine was added upon stirring. Next, 0.3 gr of Vantex-T, 0.8 gr of Dynol 607 and 0.4 gr of Tegowet 240 was added upon stirring.

Finally, an aqueous dispersion of Pro-Jet Black APD pigment was added upon stirring, as well as an aqueous dispersion of Latex A 662 and Latex U9800. The volume and concentrations of the dispersions was selected such that 3.85 gr of pigment, 6.1 gr of Latex A 662, 2.9 gr of Latex U9800 and 61.65 gr water was present per 100 gr of ink composition.

Furthermore, the amount of water present at the start of the preparation was selected such that 100 gr of ink composition CE 1 was obtained.

Ink compositions CE 2, CE 3, CE 4 and CE 5 were prepared analogously.

TABLE 2

Ink compositions CE 1-CE 5.

| Component | CE 1 | CE 2 | CE 3 | CE 4 | CE 5 |
|---|---|---|---|---|---|
| Latex A1127 | 0 | 0 | 5.9 | 5.9 | 9 |
| Latex U9800 | 2.9 | 2.9 | 2.8 | 2.8 | 0 |
| Latex A 662 | 6.1 | 6.1 | 0 | 0 | 0 |
| pigment | 3.85 | 3.85 | 3.85 | 3.85 | 4 |
| wax | 1.0 | 1.0 | 0.96 | 0.96 | 0 |
| glycerol | 0 | 0 | 9.6 | 9.6 | 0 |
| isosorbide | 5.0 | 5.0 | 0 | 0 | 0 |
| 2-Pyrrolidone | 0 | 0 | 0 | 0 | 9 |
| Propoxylated β-cyclodextrine | 0 | 0 | 0 | 2.4 | 0 |
| Maltodextrin | 2.5 | 0 | 0 | 0 | 0 |
| 1,2-hexanediol | 0 | 0 | 0 | 0 | 4 |
| Triton X-100 | 0 | 0 | 0 | 0 | 0.5 |
| Vantex T | 0.3 | 0.3 | 0.29 | 0.29 | 0.5 |
| Dynol 607 | 0.8 | 0.8 | 0.77 | 0.77 | 0.3 |
| Tegowet 240 | 0.4 | 0.4 | 0.38 | 0.38 | 0 |
| 2,3-butanediol | 8.0 | 8.0 | 0 | 0 | 0 |
| Pentaerythritol ethoxylaat | 7.5 | 7.5 | 0 | 0 | 13 |
| TEG | 0 | 0 | 5.77 | 10.57 | 0 |
| water | 61.65 | 64.15 | 69.68 | 62.48 | 59.7 |
| Viscosity (mPa s) | 6.46 | 4.66 | 3.42 | 5.79 | 6.87 |

Comparison Experiments

Drying Times of the Ink Compositions and Nozzle Open Times

The drying times of the ink compositions was tested. The results are summarized in table 3. In addition, the nozzle open times were determined for a number of ink compositions. The results are also summarized in table 3.

TABLE 3

| Ink composition: | Ex 6 | CE 3 | CE 4 |
|---|---|---|---|
| Nozzle open times (s) | 390 | 240 | 480 |
| Drying time of ink composition (s) | 70 | 60 | 80 |

Ink composition Ex 6 is an ink composition according to the present invention. Ink composition Ex 6 comprises e.g. isosorbide (4.8 wt %) and propoxylated β-cyclodextrine (2.4 wt %). Ink compositions CE 3 and CE 4 are not ink compositions according to the present invention. Ink compositions CE 3 and CE 4 differ from ink composition Ex 6 in that CE 3 and CE 4 do not comprise isosorbide. Ink composition CE 3 does also not comprise propoxylated β-cyclodextrine. Ink composition CE 3 comprises more water than ink composition Ex 6. Ink composition CE 4 comprises more TEG co-solvent than ink compositions Ex 6 and CE 3.

The ink composition according to the present invention Ex 6 has a drying time of 70 seconds. The drying time of ink composition CE 3 is 60 seconds. This is shorter than the drying time of Ex 6. However, it is known that drying times increase upon (partial) replacement of water by co-solvents. The ink composition CE 3 has a higher water content than the other ink compositions (Ex 6 and CE 4) and a lower content of co-solvents. Because of the higher water content, the energy required for drying the ink composition CE 3 will be higher compared to the other ink compositions. The drying time of ink composition CE 4, which is not an ink composition according to the present invention, is 80 seconds. This drying time is larger than the drying time of Ex 6, even though the water content of CE 4 is not higher than the water content of Ex 6.

The ink composition according to Ex 6, which is an ink composition according to the present invention, has a nozzle open time of 390 seconds. This means that, after a 6.5 minute interval in between two periods of jetting of the ink, ink was still stably ejected from the print head.

Ink compositions CE 3 and CE 4, which are not ink compositions according to the present invention, have nozzle open times of 240 s and 480 s, respectively.

The nozzle open time of CE 3 is short. This means that nozzle failure is likely to occur when jetting ink composition CE 3. The nozzle open time of CE 4 is long. However, drying of the ink composition CE 4 takes long. The drying time of ink composition Ex 6 is shorter than the drying time of CE 4.

Hence, ink composition Ex 6, which is an ink composition according to the present invention, combines a good drying time with a good nozzle open time, whereas ink compositions CE 3 and CE 4, which are not ink compositions according to the present invention, do not combine a good drying time with a good nozzle open time.

Further drying time experiments were performed, the results of which are summarized in table 4.

TABLE 4

| Ink composition: | Ex 1 | Ex 3 | Ex 5 | Ex 6 | Ex 7 | CE 5 |
|---|---|---|---|---|---|---|
| Drying time of ink composition (s) | 70 | 70 | 55 | 70 | 65 | 60 |

Ink compositions Ex 1, Ex 2 and Ex 6 comprise similar amounts of water and similar amounts of isosorbide and propoxylated β-cyclodextrine. The drying times of each of the ink compositions Ex 1, Ex 2 and Ex 6 is 70 s. Ink compositions Ex 1, Ex 2 and Ex 6 are all ink compositions according to the present invention.

Ink compositions Ex 6 and Ex 7 are both ink compositions according to the present invention. Ink compositions Ex 6 comprises isosorbide, whereas ink composition Ex 7 comprises 2-pyrrolidone. 2-Pyrrolidone is a co-solvent comprising a 5-membered ring. Ex 6 and Ex 7 comprise the same amount of co-solvent. The drying time of Ex 7 is 65 s, which is even shorter dan the drying time of Ex 6. Hence, also co-solvents comprising a ring structure, wherein the ring structure comprises a 5-membered, a six-membered or a 7-membered ring, can be usefully applied in an ink composition according to the present invention.

Ink compositions Ex 5 and CE 5 both comprise 2-pyrrolidone as a co-solvent. Ink composition Ex 5 comprises propoxylated β-cyclodextrin and is an ink composition according to the present invention, whereas ink composition CE 5 does not comprise propoxylated β-cyclodextrin and is not an ink composition according to the present invention. The drying time of Ex 5 is 55 s, whereas the drying time of CE 5 is 60 s. Even though ink composition CE 5 comprises more water than ink composition Ex 5, the drying time of Ex 5 is shorter than the drying time of CE 5. The presence of propoxylated β-cyclodextrin shortens the drying time of the ink compositions. In general, it is believed that combining a cyclodextrin compound with a co-solvent in accordance with the present invention is believed to yield inks having shorter drying times.

Fixation of the Print

The fixation of the ink compositions was tested. The results are summarized in table 5.

TABLE 5

| Ink composition | Fixation temperature (° C.) | $T_{Wisch\ rob}$ (° C.) |
|---|---|---|
| Ex 1 | 70 | >130 |
| Ex 2 | 71 | >130 |
| Ex 3 | 70 | >130 |
| Ex 4 | 70 | >130 |
| CE 1 | 80 | >130 |
| CE 2 | 84 | 120 |

The ink compositions EX 1, Ex 3 and EX 4 have a fixation temperature of 70° C. Thus, heating the print to 70° C. is sufficient to provide an image that is fixed to the receiving medium and which does not show smear. Ink composition Ex 2 has a fixation temperature of 71° C., which is very close to the Fixation temperature of ink compositions Ex 1, Ex 3 and Ex 4.

All ink compositions Ex 1-Ex 4 yield images that are not damaged when a Wisch test is performed after heating a printed image to 130° C. Hence, Images made using any of the ink compositions Ex 1-Ex 4 have a $T_{Wisch\ rob}$ of at least 130° C.

Images made using Ink composition CE 1 also have a $T_{Wisch\ rob}$ of at least 130° C. However, the fixation temperature of these images is 80° C., which is higher than the Fixation temperature of the inks according to the present invention. Also images made using ink composition CE 2 have a higher fixation temperature: i.e. 84° C. Hence, the samples made with inks not according to the present invention have higher fixation temperatures than samples made with ink according to the present invention. Hence, relatively low fixing temperatures suffice to obtain a robust image using an ink composition according to the present invention.

Ink composition CE 2 has a $T_{Wisch\ rob}$ of 120° C., which is lower than the $T_{Wisch\ rob}$ of any of the other ink compositions tested. Hence, ink composition CE 2 provides samples that are less stable against heating, whereas the inks according to the present invention (Ex 1-Ex 4) all provide samples that are stable against heating, at least up to 130° C. Thus, a stable latex film can be obtained using an ink composition according to the present invention.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed.

1. An ink composition comprising
    a water-dispersed resin
    a water dispersible colorant
    water
    wherein the ink composition further comprises isosorbide.
2. Ink composition according to claim 1, wherein the ink composition further comprises a cyclodextrine.
3. Ink composition according to claim 2, wherein the cyclodextrine is a 6-cyclodextrine.
4. Ink composition according to claim 2 or 3, wherein the isosorbide and the cyclodextrine are present in a molar ratio of from 1:20 to 20:1.
5. Ink composition according to any of the claims 2-4, wherein the water dispersed resin is compatible with the isosorbide and the cyclodextrine.
6. Method for preparing an ink composition according to claim 1, the method comprising the steps of:
    providing water;
    adding the isosorbide upon stirring;
    adding an aqueous dispersion of the water dispersed resin and an aqueous dispersion of the water dispersible colorant.

7. Method for applying an image onto a receiving medium by applying droplets of an ink composition according to any of the claims 1-5 onto the receiving medium, the method comprising the step of:
  applying droplets of the ink composition onto the receiving medium in a predefined pattern.

The invention claimed is:
1. An ink composition comprising
  a water-dispersed resin;
  a water dispersible colorant;
  a cyclodextrin compound;
  water;
  a co-solvent;
wherein the water-dispersed resin is present in an amount of 3.5 wt % or more, based on the total weight of the ink composition, wherein the water-dispersed resin is present in an amount of 80 wt % or more based on the amount of the cyclodextrin component, and wherein the co-solvent is selected from the group consisting of: saccharides and co-solvents comprising a ring structure, wherein the ring structure comprises a 5-membered, a 6-membered or a 7-membered ring.

2. Ink composition according to claim 1, wherein the cyclodextrin compound is a β-cyclodextrin compound.

3. Ink composition according to claim 1 wherein the co-solvent and the cyclodextrin are present in a molar ratio of from 1:20 to 20:1.

4. Ink composition according to claim 2, wherein the water dispersed-resin is compatible with the co-solvent and the cyclodextrin compound.

5. Ink composition according to claim 1, wherein the co-solvent is a saccharide.

6. Ink composition according to claim 5, wherein the saccharide is selected from the group consisting of a monosaccharide, a disaccharide and a trisaccharide.

7. Ink composition according to claim 4, wherein the co-solvent is isosorbide.

8. Ink composition according to claim 1, wherein the co-solvent is 2-pyrrolidone.

9. Method for preparing an ink composition according to claim 1, the method comprising the steps of:
  providing water;
  adding a co-solvent upon stirring, wherein the co-solvent is selected from the group consisting of saccharides and co-solvents comprising a ring structure, wherein the ring structure comprises a 5-membered, a 6-membered or a 7-membered ring;
  adding a cyclodextrin compound upon stirring;
  adding an aqueous dispersion of the water dispersed resin and an aqueous dispersion of the water dispersible colorant, wherein the water-dispersed resin is present in an amount of 80 wt % or more based on the amount of the cyclodextrin component.

10. Method for applying an image onto a receiving medium by applying droplets of an ink composition according to claim 1 onto the receiving medium, the method comprising the step of:
  applying droplets of the ink composition onto the receiving medium in a predefined pattern.

\* \* \* \* \*